M. C. ALTMAYER.
TIRE PROTECTOR.
APPLICATION FILED MAR. 21, 1919.
1,307,531.
Patented June 24, 1919.
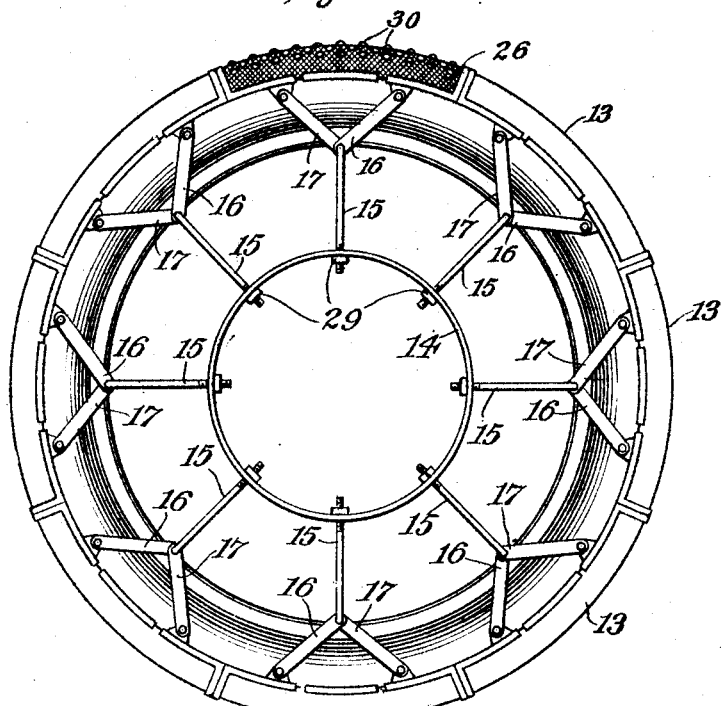
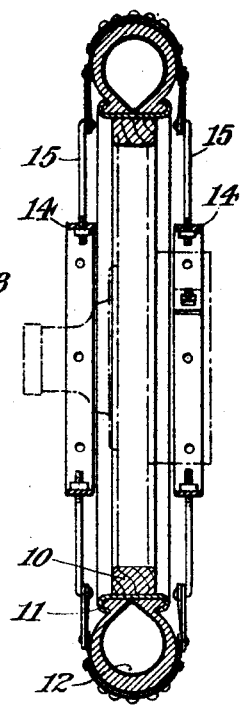
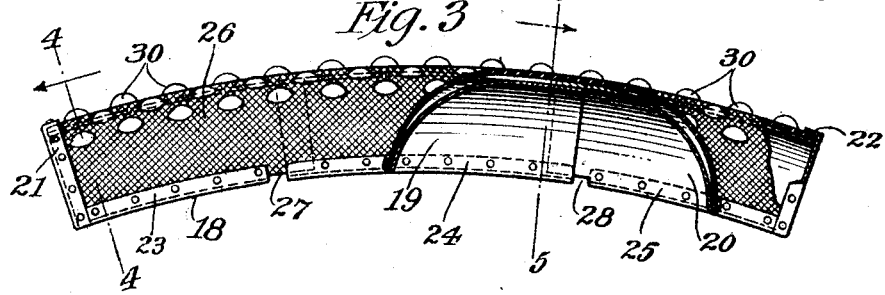
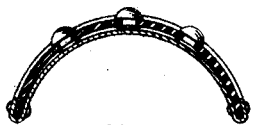
Inventor
Marvin C. Altmayer
by his Attys.
Kerr Page Cooper & Hayward

UNITED STATES PATENT OFFICE.

MARVIN C. ALTMAYER, OF NEW YORK, N. Y.

TIRE-PROTECTOR.

1,307,531.     Specification of Letters Patent.     Patented June 24, 1919.

Application filed March 21, 1919. Serial No. 284,048.

*To all whom it may concern:*

Be it known that I, MARVIN C. ALTMAYER, a citizen of the United States, residing at New York, in the county and State of New York, have invented certain new and useful Improvements in Tire-Protectors, of which the following is a full, clear, and exact description.

The invention which constitutes the subject matter of this application relates to a shield or protector particularly adapted to be used in connection with tires of automobiles.

In the drawing:

Figure 1 illustrates a side view of the felly and tire of a vehicle wheel with my invention applied thereto.

Fig. 2 is a cross-sectional view taken at substantially the axis of the wheel.

Fig. 3 is a side view of a section of the shield, a part thereof being broken away to illustrate its construction.

Fig. 4 is a section of the shield taken on line 4—4 of Fig. 3.

Fig. 5 is a section of the shield taken on line 5—5 of Fig. 3.

Referring to the drawing in detail the reference numeral 10 designates a felly, 11 a rim and 12 a tire of an ordinary form of wheel for a motor vehicle, to which no claim *per se* is made.

The shield or armor, which is the subject of my invention, is made up of a plurality of contractible and expansible units 13 each connected to the resilient members or bands 14 located on opposite sides of the wheel by means of bolts 15 and links 16 and 17. Each of the units is composed of a plurality of metallic sections, preferably 3, designated by the reference numerals 18, 19, and 20, which telescope with each other as clearly illustrated in Fig. 3.

The ends of each unit, that is to say the ends of sections 18 and 20 which are remote from each other, are provided with flanges 21 and 22. Similar flanges 23, 24 and 25 are provided on the interior circumference of the sections. These flanges 21, 22, 23, 24 and 25 afford a convenient securing means for a fabric 26 which extends over the entire outer surface of each unit.

In the normal position of the parts, that is to say with a maximum pressure in the tire, the parts assume substantially the position illustrated in Figs. 1 and 3. In this position of the various units and sections there exist spaces 27 between the flanges 18 and 19 and spaces 28 between flanges 19 and 20 to enable the sections to collapse when the pressure is lessened. The fabric 26 is preferably elastic to enable the same to collapse with said sections without buckling.

The bolts 15 are provided with adjustable nuts 29 which not only secure the units in place but enable them to be properly tensioned against the periphery of the tire.

The metallic bands 14, as shown, are of the same dimensions but it will be understood that they may be made larger or smaller to comply with the construction of the particular wheel.

The provision of separate units enables the armor to be assembled and disassembled with the minimum amount of labor. Any suitable form of non-skid elements 30 may be employed.

It is to be understood that I do not limit myself to the exact construction herein illustrated and described as many changes may be made in point of detail and other embodiments resorted to without deviating from the true spirit and scope of my invention.

What I claim is:

1. A pneumatic tire armor or guard comprising a plurality of units connected to common securing means adjacent the axis of the wheel, each of said units consisting of a plurality of collapsible sections to compensate for the varying pressures within the tire.

2. A pneumatic tire armor or guard comprising a plurality of units each individually connected to securing rings located at the sides of the wheel, each of said units consisting of a plurality of collapsible sections to compensate for the expansion or contraction of the tire.

3. As an article of manufacture a collapsible and expansible unit for a tire armor comprising a plurality of metallic sections which telescope with each other, and a fabric secured to and extending over the outer surface of said unit.

In testimony whereof I hereunto affix my signature.

MARVIN C. ALTMAYER.